(12) United States Patent
Chew et al.

(10) Patent No.: US 6,856,330 B1
(45) Date of Patent: Feb. 15, 2005

(54) METHOD AND SYSTEM FOR USER SESSIONS ON PERSONAL ELECTRONIC DEVICES

(75) Inventors: Chee H. Chew, Redmond, WA (US); Kathryn L. Parker, Fall City, WA (US); Elizabeth A. Bastiaanse, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 443 days.

(21) Appl. No.: 09/608,705

(22) Filed: Jun. 30, 2000

(51) Int. Cl.[7] .................................................. G09G 5/00
(52) U.S. Cl. ........................ 345/745; 345/746; 345/744; 345/811
(58) Field of Search ................................ 345/736, 700, 345/744, 745, 709, 708, 811, 814, 844, 867, 704, 710, 748, 749, 731–732, 721–722

(56) References Cited

U.S. PATENT DOCUMENTS

| | | | | | |
|---|---|---|---|---|---|
| 5,754,798 | A | * | 5/1998 | Uehara et al. | 710/104 |
| 5,977,964 | A | * | 11/1999 | Williams et al. | 345/721 |
| 6,404,447 | B1 | * | 6/2002 | Kitagawa | 345/867 |
| 6,430,687 | B1 | * | 8/2002 | Aguilar et al. | 713/2 |
| 6,480,727 | B1 | * | 11/2002 | Gerdisch | 455/574 |
| 6,490,624 | B1 | * | 12/2002 | Sampson et al. | 709/227 |

OTHER PUBLICATIONS

"HP Jornada 540 Series Pocket PC User's Guide", Hewlett Packard, 135 pages, 2000.

* cited by examiner

Primary Examiner—Kristine Kincaid
Assistant Examiner—Peng Ke
(74) Attorney, Agent, or Firm—Merchant & Gould PC (57) ABSTRACT

The invention provides for a method and system for displaying a separate default view for a selected application on a small computing device when a new user session for the selected application is started. Each interaction with each application and a switch are monitored and time stamped. Separate current user sessions are created for each application running on a small computing device. A current user session for a selected application is determined to be over when a maximum interval of inactivity associated with the selected application is less than the amount of time since a last interaction occurred with the selected application. When a current user session is over for a selected application, a new user session for the application is started and a default view for the application is displayed. Additionally, when a switch for controlling the small computing device transitions to an on state after an amount of time greater than another maximum interval of inactivity associated with the switch, each current user session for each application is terminated and a new user session is started for the switch. Further, a new user session is created for each application when it is selected after the new user session is started for the switch. The other maximum interval of inactivity associated with the switch can be automatically changed in proportion to the frequency of switch transitions between the on state and the off state.

23 Claims, 5 Drawing Sheets

| APPLICATION | DEFAULT STATE(S) |
|---|---|
| CALENDAR | DAY VIEW OR AGENDA VIEW (SELECTABLE) |
| CONTACTS | LIST VIEW SHOWING ALL CONTACTS |
| TASKS | LIST VIEW SHOWING ALL TASKS |
| INBOX | INBOX FOLDER VIEW |
| NOTES | LIST VIEW SHOWING ALL FOLDERS |
| WORD PROCESSOR | LIST VIEW SHOWING ALL FOLDERS |
| SPREADSHEET | LIST VIEW SHOWING ALL FOLDERS |
| BROWSER | HOME PAGE |
| MULTI-MEDIA PLAYER | PLAYER VIEW |
| FINANCIAL PLANNER | ACCOUNT MANAGER VIEW |
| ATLAS | ZOOMED OUT DEFAULT MAP (LAST USED) |
| CALCULATOR | CALCULATOR VIEW WITH 0 SHOWN IN ACCUMULATOR |
| READER | LIBRARY VIEW |
| FILE MANAGER | MY DOCUMENTS FOLDER VIEW |
| CONNECTIONS | CONNECTIONS FOLDER VIEW |
| SETTINGS | PERSONAL TAB VIEW |
| GAME | NEW GAME VIEW |
| SHELL | TODAY VIEW |

FIG. 7

METHOD AND SYSTEM FOR USER SESSIONS ON PERSONAL ELECTRONIC DEVICES

TECHNICAL FIELD

The present invention relates to a personal electronic device, and particularly to a handheld computing device. More particularly still, the present invention relates to determining when a current user session is over so that a default state for an application running on a relatively small computing device will be displayed for a new user session.

BACKGROUND OF THE INVENTION

Small, handheld electronic computing devices have been steadily growing in popularity in recent years. The devices are known by different names, such as palmtops, pocket computers, personal digital assistants, personal electronic organizers, hand held PCs (H/PCs), or the like. These devices, hereinafter "small computing devices," provide much of the same functionality as their larger counterparts. In particular, the small computing devices enable a user to perform word processing, task management, spreadsheet processing, address book functions and email functions, as well as many other functions.

In the past, a small computing device has persistently displayed the last viewed state of an application when the device was either cycled through on-off-on states or a particular application was accessed after an extended interval of inactivity. Although the user might be prompted to log in again after cycling the states of the device or extended intervals of inactivity, the prior art has not provided for "resetting" an application to a particular default state/view.

There are some scenarios where it would be preferable to display a default state for an application running on a small electronic device instead of the last displayed state. For example, when a small computing device is turned off for more than 24 hours, a current user session for the device is probably over. When the device is eventually turned on again, the user typically wants to start a new user session to complete a new task that may be significantly different than the task performed in the last user session. In this case, navigation to a particular application to complete the new task could be made easier if all of the applications on the device were displayed in their default states for the new user session.

Also, when a small computing device is turned "on" and applications running on the device have not been selected for an extended period of time e.g., one hour or more, it might be preferable for these applications to return to their default states. Although a small computing device can be left turned "on" in a charging cradle for extended periods of time without user interaction, the last state of each application on the device may not be preferred when a new user session is eventually started to solve another task at a later time.

A more complete appreciation of the invention and its improvements can be obtained by reference to the accompanying drawings, which are briefly summarized below, to the following detail description of presently preferred embodiments of the invention, and to the appended claims.

SUMMARY OF THE INVENTION

In accordance with the invention, the above and other problems are solved by determining when a current user session has ended on a computing device and enabling each application running on the device to display a default state or preferred view when a new user session is started. When an application is selected, an amount of time, since a last interaction with the application, is determined and compared to an interval of time associated with a current user session for the application. If the determined amount of time is greater than the interval of time associated with the current user session for the application, the current user session is ended and a new user session is started for the selected application. The default state of the selected application is displayed on the computing device when the new user session for the selected application is started.

In accordance with other aspects of the invention, each application running on the computing device can be associated with a separate current user session and a separate interval of time that represents a maximum period of inactivity for the selected application. The interval of time may be editable for each application.

In accordance with still other aspects of the invention, when a switch for the computing device is transitioned to an on state, an amount of time between a last transition of the switch to an off state or the automatic transition of the computing device to the off state and a current transition of the switch to the on state is determined. The determined amount of time is compared with a segment of time that is associated with a current user session for the switch. If the determined amount of time is greater than the segment of time associated with the current user session for the switch, the current user session for each application is ended and a new user session for the switch is started. When the application is selected after the new user session is started for the switch, the preferred view of the default state of the selected application will be displayed on the computing device and a new user session will be started for the selected application. It is envisioned that a switch may be employed to control the power for the computing device and/or control a function such as automatically displaying an application associated with the switch.

In accordance with yet other aspects of the invention, a length of the segment of time can be automatically adjusted in proportion to a frequency of operation of the switch. The length of the segment of time can be increased when the frequency of the operation of the switch is greater than a defined value. Also, the length of the segment of time can be decreased when the frequency of the operation of the switch is greater than a defined value.

In accordance with still other aspects of the invention, a time stamp is generated for each selection of each application and another time stamp is generated for each transition of the switch between the on state and the off state.

In accordance with other aspects of the invention, each application may be associated with a separate priority value that is employed to determine when to stop running each application during a period of inactivity based on a plurality of characteristics. A frequency of interaction with a particular application is one characteristic that can be employed to dynamically change the priority value associated with the particular application. The priority value associated with the particular application may be increased when a high frequency of interaction occurs. Similarly, the priority value associated with the particular application may be decreased when a low frequency of interaction occurs.

The invention may be implemented as a computer process, a computing system or as an article of manufacture such as a computer program product or computer readable medium. The computer program product may be a computer storage medium readable by a computer system and encoding a computer program of instructions for executing a computer process. The computer program product may also be a propagated signal on a carrier readable by a computing system and encoding a computer program of instructions for executing a computer process.

These and other features as well as advantages, which characterize the invention, will be apparent from a reading of the following detailed description and a review of the associated drawings.

BRIEF DESCRIPTION OF THE DRAWINGS

FIG. 2 is a flow diagram illustrating the operational characteristics for determining if a current user session is over when the small computing device is turned on;

DETAILED DESCRIPTION OF THE PREFERRED EMBODIMENT

An embodiment of the invention provides for creating separate user sessions for each application running on a small computing device, monitoring each interaction with the device and determining when a current user session is over based on a comparison between a defined period of inactivity and the amount of time since a last interaction occurred. Once a current user session is determined to be over for an application running on the device, a default state for the application will be displayed the next time the application is selected and a new user session will be created at that time. The invention compares the amount of time between a last interaction and a predetermined interval of inactivity to determine when a current user session is over for a particular application regardless of whether or not the small computing device is turned "on" or "off." Additionally, when a switch for controlling the small computing device transitions to an on state after an amount of time greater than a predetermined interval of inactivity associated with the switch, each current user session for each application is terminated and a new user session is created for each application when each application is selected. The switch may control the power for the small computing device and/or cause the automatic display of an application associated with the switch.

The logical operations of the various embodiments of the invention are implemented (1) as a sequence of computer implemented actions or program modules running on a small computing device; and/or (2) as interconnected hardware or logic modules within the small computing device. The implementation is a matter of choice dependent on the performance requirements of the small computing system implementing the invention. Accordingly, the logical operations making up the embodiments of the invention described herein are referred to alternatively as operations, actions or modules. Generally, program modules include routines, programs, objects, components, data structures, etc. that perform particular tasks or implement particular abstract data types. Typically, the functionality of program modules may be combined or distributed in various embodiments.

The term "user session" directed to a variable interval of time that is determined by how frequently a device is activated and/or an application is selected. When not used frequently enough (as determined by a timeout feature), the device/application is reset to its default state when it is activated/selected.

The term "interaction" is directed to any tap or gesture with a stylus, operation of a hardware switch and the receipt of data from another device, e.g., a connected PC or an H/PC.

The term "application" is directed to a specific purpose program that runs on the device, including but not limited to calendar, calculator and shell.

Figure 1:
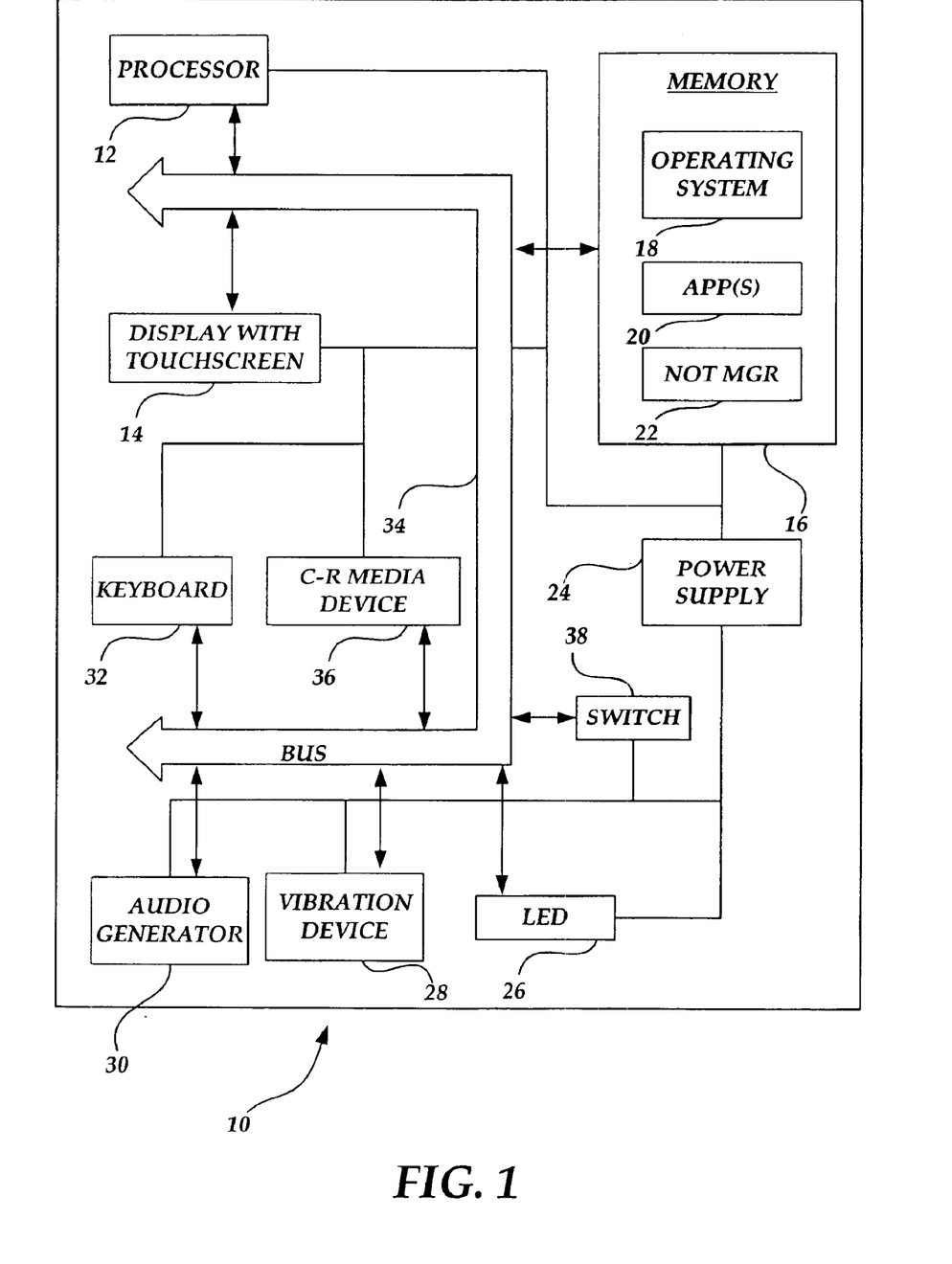
FIG. 1 shows a block diagram of a small computing device used in an embodiment of the invention.

FIG. 1 illustrates one embodiment of a suitable operating environment for a small computing device 10 in which the invention may be implemented. The device 10 is only one embodiment of a suitable operating environment and is not intended to suggest any limitation as to the scope of use or functionality of the invention. Other well known computing systems, environments, and/or configurations that may be suitable for use with the invention include, but are not limited to, personal computers, server computers, client computers, laptop devices, multiprocessor devices, microprocessor based systems, programmable consumer electronics, network PCs, minicomputers, mainframe computers, client-server environments, distributed computing environments that include any of the above systems or devices, and the like.

FIG. 1 shows functional components of the small computing device 10. The device 10 includes a processor 12, a memory 16, a touch sensitive display 14, a keyboard 32, a computer readable media device 36 and a switch 38. The memory 16 generally includes both volatile memory (e.g., RAM) and non-volatile memory (e.g., ROM, PC cards, etc.). An operating system 18 is resident in the memory 16 and executes on the processor 12, such as the Windows® CE or Windows® for Pocket PC® operating systems from the Microsoft® Corporation. The switch 38 is a manual control for transitioning the device 10 between an on state and an off state.

One or more application programs 20 are loaded into memory 16 and run on the operating system 18. Examples of applications include email programs, scheduling programs, PIM (personal information management) programs, word processing programs, spreadsheet programs, Internet browser programs, and so forth. The small computing device 10 also has a notification manager 22 loaded in memory 16, which executes on the processor 12. The notification manager 22 handles notification requests from the applications 20. The device 10 has a power supply 24, which is implemented as one or more batteries. The power supply 24 might further include an external power source that overrides or recharges the built-in batteries, such as an AC adapter or a powered docking cradle.

The small computing device 10 is also shown with three types of external notification mechanisms: a light emitting diode (LED) 26, a vibration device 28, and an audio generator 30. These devices are directly coupled to the power supply 24 so that when activated, they remain on for a duration dictated by the notification mechanism even though the processor 12 and other components might shut down to conserve power from a battery. The LED 26 preferably remains on from a selectable period of time or until the user takes action. Since the vibration device 28 and the audio generator 30 can consume a large amount of power from a battery, they can be configured to turn off when other components of the small computing device have turned off or at some time interval after activation. Additionally, a bus 34 provides a communication path between the processor 12, display 14, memory 16, LED 26, vibration device 28, audio generator 30, keyboard 32, computer readable media device 36 and the switch 38.

The small computing device 10 may operate with at least some form of computer readable media. Computer readable media can be any available media that can be accessed by the computer readable media device 36. By way of example, and not limitation, computer readable media may comprise computer storage media and communications media. Computer storage media includes volatile and nonvolatile, removable and non-removable media implemented in any method or technology for storage of information such as computer readable instructions, data structures, program modules, or other data. Computer storage media includes, but is not limited to, random access memory (RAM), read only memory (ROM), electrically erasable programmable read only memory (EEPROM), flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the small computing device 10. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

Figure 2:
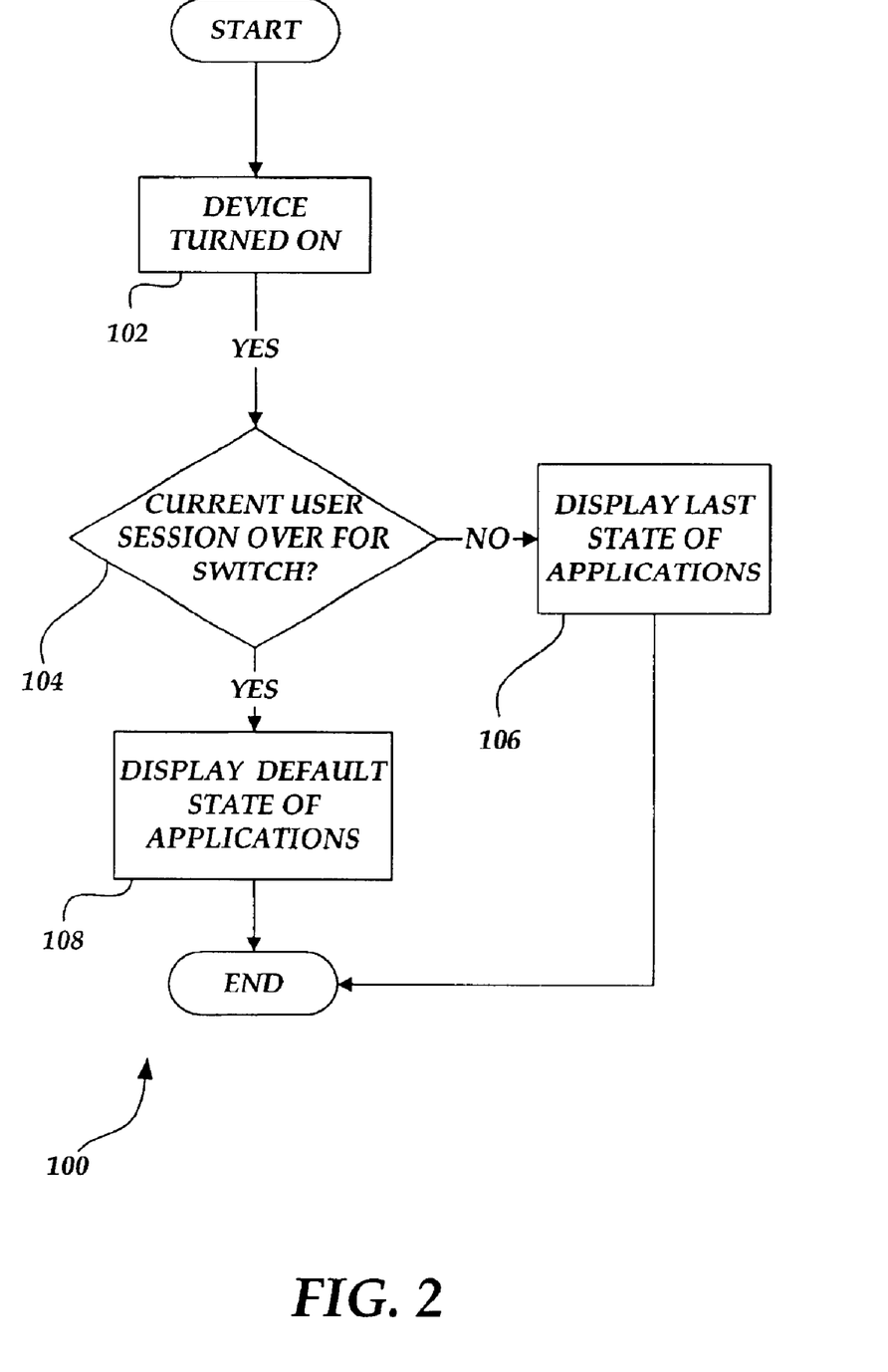

FIG. 2 illustrates a flow chart 100 that shows the actions for one embodiment when a small computing device is turned on. The operation flow begins at a module 102 when a switch for controlling some aspect of the small computing device, e.g., a power switch, is determined to have transitioned from an "off" state to an "on" state. The flow moves to a decision module 104 where a determination is made whether a current user session associated with the switch is over. If the amount of time, since the last switch transition to the "on" state, is found to be less than the predetermined interval of inactivity for the switch's current user session, then the flow moves to a module 106 where applications running on the small computing device will display their last state of the current user session when they are selected. Next, the operation flow moves to an end module and performs other program operations. Thus, when a switch is transitioned/returned to the "on" state after a relatively short period of time in the "off" state, the selection of an application running on the small computing device will cause the display of the last state in the current user session for the selected application.

Alternatively, when the amount time since the last transition to the "on" state is determined to be greater than the predetermined interval of inactivity for the switch's current user session at the decision module 104, the flow advances to a module 108 where the current user sessions for each of the applications and the switch are terminated, and a new user session is started for the switch. Thus, when an application is selected, the application is displayed in a default state and a new user session is started for the application. The operation flow moves to the end module and performs other program operations. Also, when a predetermined interval of time for any type of interaction with the small computing device expires, i.e., application or switch, the small computing device will automatically turn itself off and the operational flow will perform substantially the same actions as discussed here and above.

Additionally, the predetermined interval of inactivity for the switch is a relatively large amount of time, e.g., 4 or more hours, that is typically greater than a predetermined interval of inactivity associated with the current user session for any application running on the small computing device. The predetermined interval of inactivity for the switch may be selectable.

Figure 3:
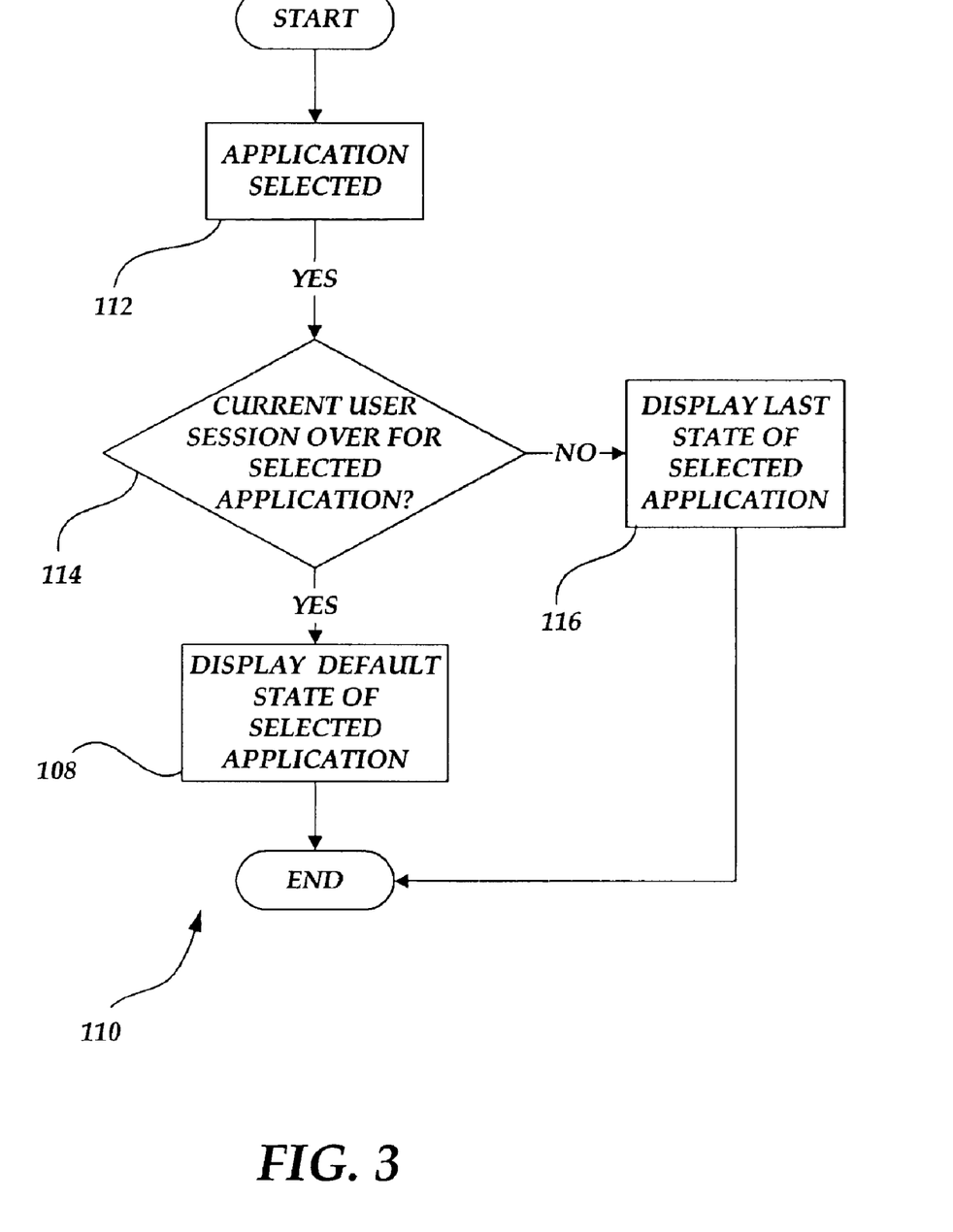
FIG. 3 is a flow diagram showing the operational characteristics for determining if a current user session is over when an application is selected.

FIG. 3 illustrates a flow chart 110 that shows the actions for one embodiment when an application running on a small computing device is selected. The operation flow begins at a module 112 when a running application is selected. The flow advances to a decision module 114 where a determination is made whether the current user session associated with the selected application is over. If the amount of time since the last interaction with the selected application is found to be less than a predetermined interval of inactivity associated with the application's current user session, the flow moves to a module 116 where the last state of the selected application is displayed on the small computing device. Next, the flow moves to an end module and performs other program operations.

Alternatively, at the decision module 114, when the amount of time since the last interaction with the selected application is found to be greater than a predetermined interval of inactivity associated with the application's current user session, then the flow advances to a module 108 where a new user session is created for the selected application and it is displayed in a default state on the small computing device. The flow then advances to the end module and performs other program operations.

Additionally, it is envisioned that the predetermined interval of inactivity associated with a current user session for an application may be selectable. Typically, the application's predetermined interval of inactivity is an amount of time less than the switch's predetermined interval of inactivity.

Figure 4:
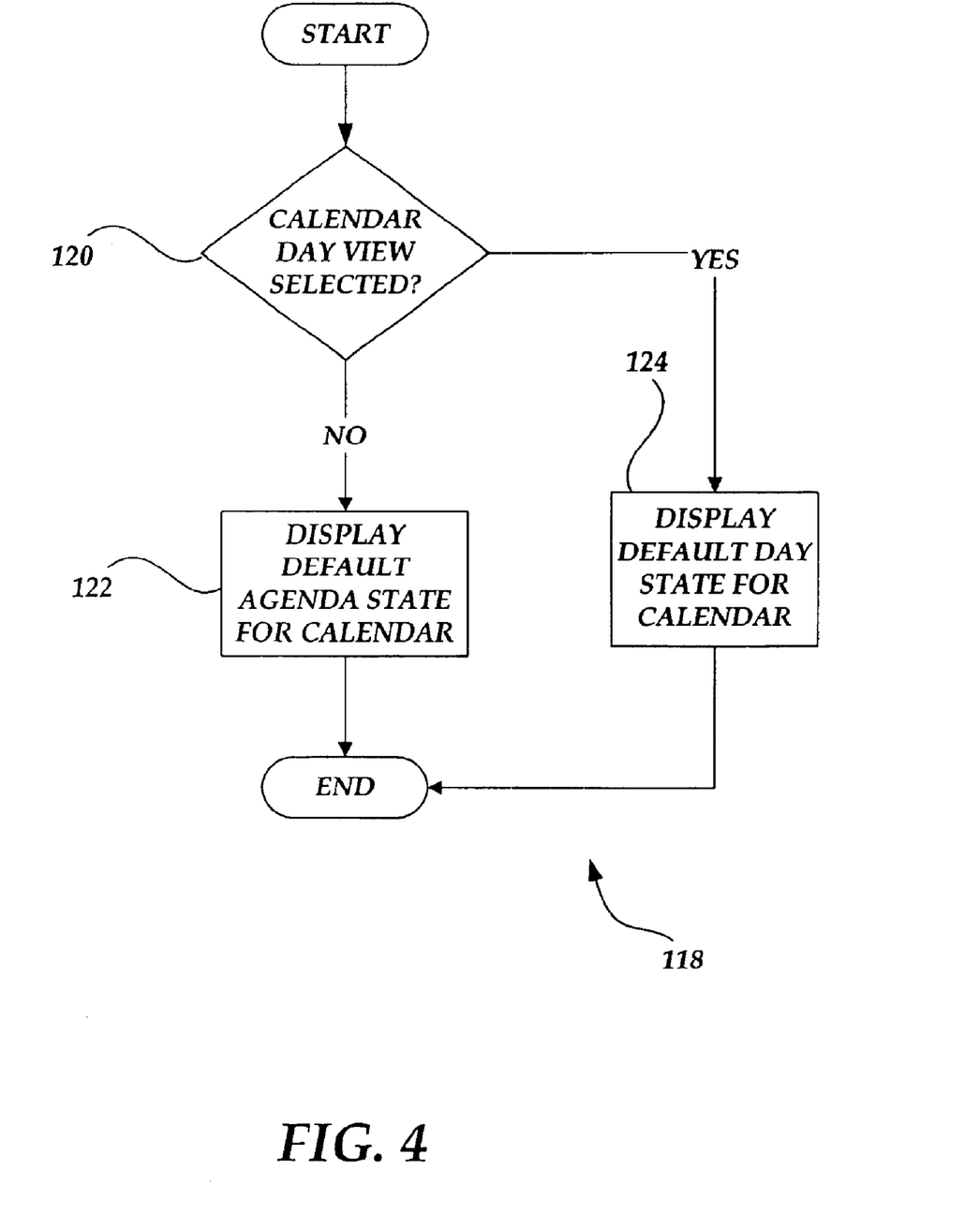
FIG. 4 is a flow diagram illustrating the operational characteristics for determining the default state for an exemplary calendar application.

FIG. 4 illustrates a flow chart 118 that shows in greater detail the actions of one embodiment for displaying the default state of an exemplary calendar _application. Although the calendar application is described as enabling the default state to be selected from one of two states (day view or agenda view), it is envisioned that other applications running on a small computing device may enable selection of multiple default states.

The operation flow begins at a decision module 120 where a determination is made whether the calendar day view is selected as the default state for the calendar application. If true, the flow moves to a module 124 where the selected day view default state for the calendar application is displayed by the small computing device. Next, the flow returns to calling other program operations.

Alternatively, when the determination at the decision module 120 is false, the flow moves to a module 122 where, the agenda view is displayed as the default view for the calendar application by the small computing device. Similarly, the flow returns to calling other program operations.

Figure 5:
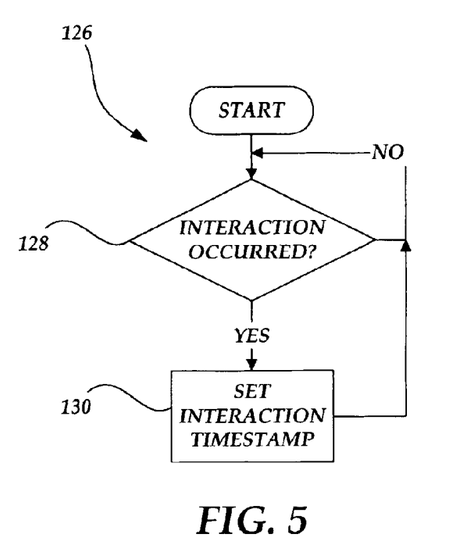
FIG. 5 is a flow diagram showing the operational characteristics for generating time stamps.

FIG. 5 illustrates a flow chart 126 that shows in greater detail the actions of one embodiment to create time stamps for each selection of an application and each transition of the switch. The operation flow begins at a decision module 128 where a determination is made whether an interaction occurred with either an application running on the small computing device or the switch. If true, the flow advances to a module 130 where a time stamp for the current interaction is created. Depending upon the interaction, the new time stamp will be associated with a current user session for the selected application running on the small computing device or the current user session for the switch. Next, the flow loops back to the decision module 128 where substantially the same actions are performed in a similar manner. Alternatively, when the determination at the decision module 128 is false, the flow will loop until an interaction occurs with either an application running on the small computing device or the switch.

Figure 6:
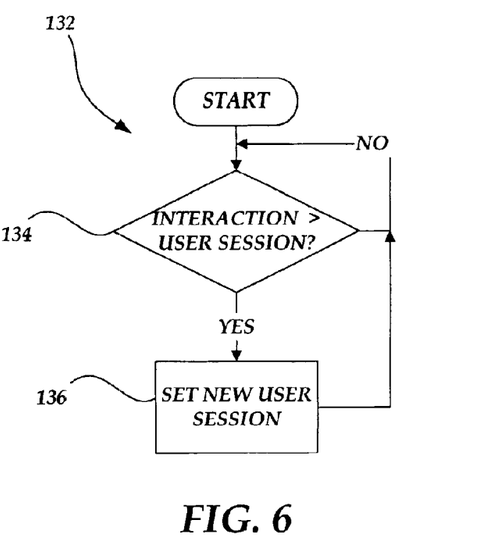
FIG. 6 is a flow diagram illustrating the operational characteristics for employing time stamps to determine when a current user session is over.

FIG. 6 illustrates a flow chart 132 that shows in greater detail the actions of one embodiment for determining whether a new user session should be created for an application running on the small computing device or the switch. The operation flow begins at a decision module 134 where a determination is made whether the difference between the current time and a new time stamp for an interaction with either an application or the switch is greater than a predetermined interval of inactivity associated with the respective application or the switch. If true, the flow advances to a module 136 where a new user session and a new interaction time stamp are created for the respective application or switch.

Next, the flow returns to the decision module 134 and performs substantially the same operations in substantially the same manner discussed above. Alternatively, when the determination at the decision module 134 is found to be false, the flow continues to loop at decision module 134 until the determination is found to be true.

Additionally, it is envisioned that each of the intervals of inactivity associated with a particular application or the switch could be user selectable/editable. It is also envisioned that the connection/disconnection of the small computing device to a docking cradle will not cause a current user session to end.

Figure 7:
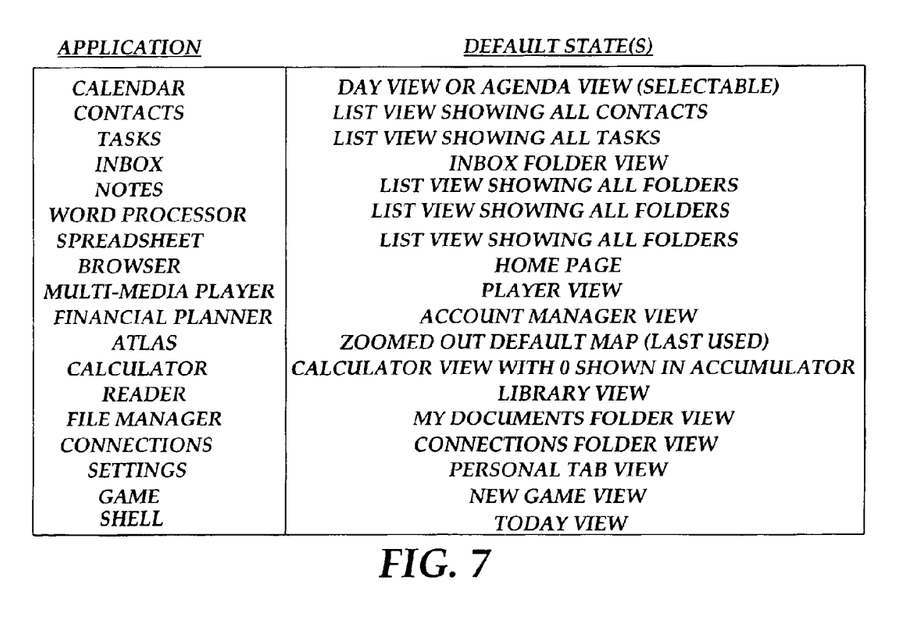
FIG. 7 is a table listing exemplary applications and their respective default states.

FIG. 7 illustrates a table that lists exemplary applications and their respective default states. This table does not provide a complete listing of every application and their respective default state for use with the invention. Instead, the table is intended to generally illustrate how each application running on a small computing device may display a particular default state for a new user session. Also, the default states for different applications such as the Inbox and Contacts can cause any previously configured filters to be reset to a default mode. Further, the shell for the operating system can be configured to display a default state, e.g., a Today view, when its current user session is found to be over.

In one embodiment, the length of the interval of inactivity associated with the switch may be automatically adjusted according to the frequency of operation of the switch. When the switch is frequently operated, the invention may increase the length of the interval of inactivity associated with the switch. Similarly, when the switch is not frequently operated, the length of the interval of inactivity may be decreased.

In another embodiment, the invention may be employed as a tool by a separate mechanism for terminating an application to reclaim resources, such as memory or processor resources. After analyzing various characteristics associated with executing applications, this mechanism selects the 'best' application to terminate based on a priority value assigned to each application. The priority value for each application is determined by adding together values for multiple characteristics, including average launch time, average memory usage, class or type of application, frequency of usage, amount of stored data and user session.

Since many embodiments of the invention can be made without departing from the spirit and scope of the invention, the invention resides in the claims hereinafter appended.

We claim:

1. In a computing device, a method for determining a starting point for an application when a new user session is started, comprising the acts of:

determining an amount of time since a last interaction with the application;

adjusting an interval of time associated with a current user session for the application in proportion to the frequency of interaction with the application, wherein adjusting the interval of time comprises:

increasing the length of the interval of time when the frequency of interaction with the application is greater than a defined value; and decreasing the length of the interval of time when the frequency of interaction with the application is less then the defined value;

comparing the interval of time to the determined amount of time; and when the determined amount of time is greater than the interval of time associated with the current user session for the application, ending the current user session and starting the new user session for the application at the starting point when the application is selected.

2. The method of claim 1, wherein each application running on the computing device is associated with a separate current user session and a separate interval of time.

3. The method of claim 1, wherein the interval of time represents a maximum period of inactivity for the selected application.

4. The method of claim 1, wherein the interval of time is editable for each application.

5. The method of claim 1, further comprising:

when a switch for the computing device is transitioned to an on state, determining an amount of time between a last transition of the switch to an off state and a current transition of the switch to the on state;

comparing another interval of time to the determined amount of time, the other interval of time being associated with a current user session for the switch; and when the determined amount of time is greater than the other interval of time associated with the current user session for the switch, ending the current user session for the application and starting a new user session for the switch, whereby a selection of the application will cause a selected view to be displayed on the computing device and the new user session to be started for the selected application.

6. The method of claim 1, further comprising:

when a switch for the computing device is transitioned to an on state, determining an amount of time between a last automatic transition of the computing device to an off state and a current transition of the switch to the on state;

comparing another interval of time to the determined amount of time, the other interval of time being associated with a current user session for the switch; and when the determined amount of time is greater than the other interval of time associated with the current user session for the switch, ending the current user session for the application and starting a new user session for the switch, whereby a selection of the application will cause a selected view to be displayed on the computing device and the new user session to be started for the selected application.

7. The method of claim 5, wherein a length of the other interval of time is automatically adjusted in proportion to a frequency of operation of the switch, including:

increasing the length of the other interval of time when the frequency of the operation of the switch is greater than a defined value; and decreasing the length of the other interval of time when the frequency of the operation of the switch is less than the defined value.

8. In a small computing device, a method for displaying a selected view when a new user session is started for one of a plurality of applications on the small computing device, comprising the acts of:

determining an amount of time since a last selection of the application;

comparing the determined amount of time for the application to an interval of time that is associated with a current user session for the application;

when the determined amount of time for the application is greater than the interval of time, ending the current user session for the selected application ad starting a new user session for the application when the application is selected, wherein the selected view of the selected application is displayed in the new user session;

associating each application with a separate priority value;

employing each separate priority value to determine when to stop running each application on the small computing device during a period of inactivity;

employing a frequency of interaction with a particular application to dynamically change the priority value associated with the particular application;

increasing the priority value associated with the particular application when a high frequency of interaction occurs; and decreasing the priority value associated with the particular application when a low frequency of interaction occurs.

9. The method of claim 8, further comprising:

generating a time stamp for each interaction with each application, each time stamp being employed to determine the amount of time since the last interaction; and generating another time stamp for each transition of the switch between the on state and the off state, each other time stamp being employed to determine the amount of time since the last operation of the switch.

10. The method of claim 8, wherein each application is associated with a separate selected view.

11. The method of claim 10, wherein the selected view is editable for each application.

12. The method of claim 8, wherein the switch is a power switch for the small computing device.

13. The method of claim 8, wherein the switch is a function switch for the small computing device.

14. A system for communicating between a client process and a server process in a computing device, comprising:

the client process performing actions, including:

determining an amount of time since a last selection of the application; and when a switch for the computing device is transitioned to an on state, determining another amount of time representing a difference between a last transition of the switch to an off state and the current transition of the switch to the on state; and the server process performing actions, including:

adjusting an interval of time associated with a current user session for the application in proportion to the frequency of interaction with the application, wherein adjusting the interval of time comprises:

increasing the length of the interval of time when the frequency of interaction with the application is greater than a defined value; and decreasing the length of the interval of time when the frequency of interaction with the application is less than the defined value;

comparing the determined amount of time for the application to the interval of time;

when the determined amount of time for the application is greater than the interval of time associated with the current session for the application, ending the current user session and starting a new user session for the application when the application is selected, wherein the server process causes a selected view of the selected application to be displayed in the new user session for the selected application;

adjusting another interval of time associated with a current user session for the switch in proportion to the frequency of operation of the switch;

comparing the other interval of time to the other amount of time; and when the other amount of time is greater than the other interval of time associated with the current user session for the switch, ending each current user session for each application and starting a new user session for the switch, wherein the server process will cause the selected view to be displayed on the computing device and a separate new user session to be started for a selection of any one of a plurality applications on the computing device.

15. The system of claim 14, wherein the switch controls the power for the computing device.

16. The system of claim 14, wherein the switch is a function switch for the computing device.

17. The system of claim 14, wherein the client process generates a time stamp for each interaction with each application and each transition of the switch.

18. A system for a client-server environment in a computing device, the client performing actions, comprising:

determining an amount of time since a last selection of an application running on the computing device;

when a switch for the computing device is transitioned to an on state, determining another amount of time representing a difference between a last transition of the switch to an off state and the current transition of the switch to the on state; and enabling the server to perform actions, including:

adjusting an interval of time associated with a cat user session for the application in proportion to the frequency of interaction with the application, wherein adjusting the interval of time comprises:
increasing the length of the interval of time when the frequency of interaction with the application is eater than a defined value; and
decreasing the length of the interval of time when the frequency of interaction with the application is less than the defined value;
comparing the determined amount of time for the application to the interval of time;
when the determined amount of time for the application is greater than the interval of time associated with the current session for the application, ending the current user session and starting a new user session for the application when the application is selected, wherein the server causes a selected view of the selected application to be displayed in the new user session for the selected application;
adjusting another interval of time associated with a current user session for the switch in proportion to the frequency of operation of the switch;
comparing the other interval of time to the other amount of time; and
when the other amount of time is greater than the other interval of time associated with the current user session for the switch, ending each current user session for each application and staring a new user session for the switch, wherein the server causes the selected view to be displayed on the computing device and a separate new user session to be started for a selection of any one of a plurality applications on the computing device.

19. A system for communicating between a client process and a server process in a computing device, comprising:
the client process performing actions, including:
determining an amount of time since a last selection of the application; and
when a switch for the computing device is transitioned to an on state, determining another amount of time representing a difference between a last transition of the switch to an off state and the current transition of the switch to the on state; and
the server process performing actions, including:
adjusting an interval of time associated with a current user session for the application in proportion to the frequency of interaction with the application;
when the determined amount of time for the application is greater than the interval of time associated with the current session for the application, ending the current user session and starting a new user session for the application when the application is selected, wherein the server process causes a selected view of the selected application to be displayed in the new user session for the selected application;
adjusting another interval of time associated with a current user session for the switch in proportion to the frequency of operation of the switch, wherein adjusting the other time interval comprises:
increasing the length of the interval of time when the frequency of operation of the switch is greater than a defined value; and
decreasing the length of the interval of time when the frequency of operation of the switch is less than the defined value;
comparing the other interval of time to the other amount of time; and
when the other amount of time is greater than the other interval of time associated with the current user session for the switch, ending each current user session for each application and starting a new user session for the switch, wherein the server process will cause the selected view to be displayed on the computing device and a separate new user session to be started for a selection of any one of a plurality applications on the computing device.

20. The system of claim 19, wherein the switch controls the power for the computing device.

21. The system of claim 19, wherein the switch is a function switch for the computing device.

22. The system of claim 19, wherein the client process generates a time stamp for each interaction with each application and each transition of the switch.

23. A system for a client-server environment in a computing device the client performing actions, comprising:
determining an amount of time since a last selection of an application running on the computing device;
when a switch for the computing device is transitioned to an on state, determining another amount of time representing a difference between a last transition of the switch to an off state and the current transition of the switch to the on state; and
enabling the server to perform actions, including:
adjusting an interval of time associated with a current user session for the application in proportion to the frequency of interaction with the application;
comparing the determined amount of time for the application to the interval of time;
when the determined amount of time for the application is greater than the interval of time associated with the current session for the application, ending the current user session and starting a new user session for the application when the application is selected, wherein the server causes a selected view of the selected application to be displayed in the new user session for the selected application;
adjusting another interval of time associated with a current user session for the switch in proportion to the frequency of operation of the switch, wherein adjusting the other interval of time comprises:
increasing the length of the interval of time when the frequency of operation of the switch is greater than a defined value; and
decreasing the length of the interval of time when the frequency of operation of the switch is less than the defined value;
comparing the other interval of time to the other amount of time; and
when the other amount of time is greater than the other interval of time associated with the current user session for the switch, ending each current user session for each application and starting a new user session for the switch, wherein the server causes the selected view to be displayed on the computing device and a separate new user session to be started for a selection of any one of a plurality applications on the computing device.

* * * * *